United States Patent
Park et al.

(10) Patent No.: US 10,599,341 B2
(45) Date of Patent: Mar. 24, 2020

(54) STORAGE DEVICE OPERATING TO PREVENT DATA LOSS WHEN COMMUNICATING IS INTERRUPTED

(71) Applicant: Samsung Electronics Co., Ltd., Suwon-si, Gyeonggi-do (KR)

(72) Inventors: Jeong-Woo Park, Yongin-si (KR); Younwon Park, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 150 days.

(21) Appl. No.: 15/168,234

(22) Filed: May 30, 2016

(65) Prior Publication Data
US 2017/0046083 A1 Feb. 16, 2017

(30) Foreign Application Priority Data
Aug. 11, 2015 (KR) .......................... 10-2015-0113391

(51) Int. Cl.
*G06F 3/06* (2006.01)

(52) U.S. Cl.
CPC .......... *G06F 3/0619* (2013.01); *G06F 3/0656* (2013.01); *G06F 3/0679* (2013.01)

(58) Field of Classification Search
CPC .... G06F 3/0679; G06F 3/0656; G06F 3/0611; G06F 3/0619
See application file for complete search history.

(56) References Cited

U.S. PATENT DOCUMENTS

| | | | |
|---|---|---|---|
| 5,895,488 A | 4/1999 | Loechel | |
| 6,442,634 B2 | 8/2002 | Bronson et al. | |
| 8,296,468 B2 | 10/2012 | Kambayashi et al. | |
| 8,370,562 B2 | 2/2013 | Lasser | |
| 8,578,100 B1 | 11/2013 | Huynh et al. | |
| 8,645,657 B2 | 2/2014 | Colgrove et al. | |
| 2008/0209109 A1 | 8/2008 | Lasser | |
| 2010/0306448 A1* | 12/2010 | Chen .................. | G06F 12/0804 711/103 |
| 2012/0023266 A1 | 1/2012 | Kambayashi et al. | |
| 2012/0079171 A1* | 3/2012 | Ju ....................... | G06F 12/0246 711/103 |
| 2013/0086311 A1 | 4/2013 | Huang et al. | |
| 2013/0097369 A1* | 4/2013 | Talagala ............. | G06F 12/0246 711/103 |
| 2013/0135816 A1 | 5/2013 | Huang | |
| 2013/0275710 A1 | 10/2013 | Colgrove et al. | |
| 2014/0237205 A1* | 8/2014 | Takefman ............ | H03M 13/05 711/162 |
| 2014/0281123 A1 | 9/2014 | Weber | |
| 2015/0006663 A1 | 1/2015 | Huang | |
| 2016/0011965 A1* | 1/2016 | Murphy .............. | G06F 12/0246 711/103 |
| 2016/0313921 A1* | 10/2016 | Kojima ................ | G06F 3/0605 |
| 2016/0350015 A1* | 12/2016 | Luo ....................... | G06F 3/0619 |

* cited by examiner

*Primary Examiner* — Hashem Farrokh
(74) *Attorney, Agent, or Firm* — Renaissance IP Law Group LLP

(57) ABSTRACT

A storage device comprising: at least one nonvolatile memory; a buffer; and a memory controller configured to: receive data from a host; store the data in the buffer; and flush the data in the buffer to the at least one nonvolatile memory in response to an absence of communication with the host for a reference time duration.

16 Claims, 12 Drawing Sheets

STORAGE DEVICE OPERATING TO PREVENT DATA LOSS WHEN COMMUNICATING IS INTERRUPTED

CROSS-REFERENCE TO RELATED APPLICATIONS

The present application claims priority under 35 U.S.C. § 119 to Korean Patent Application No. 10-2015-0113391 filed on Aug. 11, 2015, in Korean Intellectual Property Office, the entire contents of which are incorporated herein by reference.

TECHNICAL FIELD

The present disclosure relates to data storage, and more particularly, relates to a configuration and an operation capable of preventing data loss in the storage device.

DESCRIPTION OF THE RELATED ART

Currently, various kinds of electronic devices are being used. An electronic device performs its own functions according to operations of several electric/electronic circuits included therein. In some cases, an error may occur in an operation of a circuit, and an electronic device may operate abnormally. However, most electronic devices employ a "recovery scheme" to resolve the abnormal operations and return to normal operation.

A storage device is an example of such electronic devices. The storage device stores or outputs data while communicating with a host. The storage device provides a storage service according to operations of electric/electronic circuits included therein.

In some cases, an error may occur in interfacing between the storage device and the host, and communication between the storage device and the host may be interrupted. A communication protocol that is adopted to interface between the storage device and the host may employ a recovery scheme to resolve the interrupted communication.

However, even though the recovery scheme is performed, the error on interfacing may not be completely recovered. In the worst case, data stored in the storage device may be lost. The data loss may degrade reliability of a storage device or a storage system. Furthermore, when data is lost, a user of the storage device or the storage system may suffer damage.

SUMMARY

Some embodiments include a storage device comprising: at least one nonvolatile memory; a buffer; and a memory controller configured to: receive data from a host; store the data in the buffer; and flush the data in the buffer to the at least one nonvolatile memory in response to an absence of communication with the host for a reference time duration.

Some embodiments include a storage device comprising: at least one nonvolatile memory; a buffer; and a memory controller configured to: receive data from a host; store the data in the buffer; and flush the data in the buffer to the at least one nonvolatile memory without a command provided from the host.

Some embodiments include a storage device comprising: at least one nonvolatile memory; a buffer; and a memory controller configured to: receive data from a host; store the data in the buffer; and flush the data in the buffer to the at least one nonvolatile memory before receiving a reset command from the host and before receiving a flush command from the host.

BRIEF DESCRIPTION OF THE DRAWINGS

The above and other objects, features, and advantages will become apparent from the following description with reference to the following figures, wherein like reference numerals refer to like parts throughout the various figures unless otherwise specified, and wherein.

DETAILED DESCRIPTION OF EMBODIMENTS

All the above-mentioned features and the following description are provided to help better understanding of the embodiments. That is, embodiments should not be construed as limited to the particular embodiments set forth herein, and may take different forms. The following embodiments are merely examples for fully disclosing the concepts, and are described to provide an understanding of the concepts to those skilled in the art. Therefore, if there are many ways to implement the components, operations, or the like of some embodiments, in other embodiments, those components, operations, or the like may be implemented with any of those ways.

If an embodiment is described in a configuration that includes/comprises specific component(s) or a process includes/comprises specific operation(s), other component(s) or other operation(s) may be further included. That is, the terms used herein are only intended to describe the particular embodiments, and is not intended to limit the scope of all embodiments. Further, the examples described to help better understanding of the embodiments include their complementary embodiments.

The terms used herein have the meanings in which those skilled in the art would generally understand. The terms commonly used are to be construed as consistent with meanings to one of skill in the art. In addition, the terms used herein should not be interpreted as an overly ideal or formal sense unless explicitly so defined herein. Hereinafter, embodiments will be described below with reference to the attached drawings.

Figure 1:
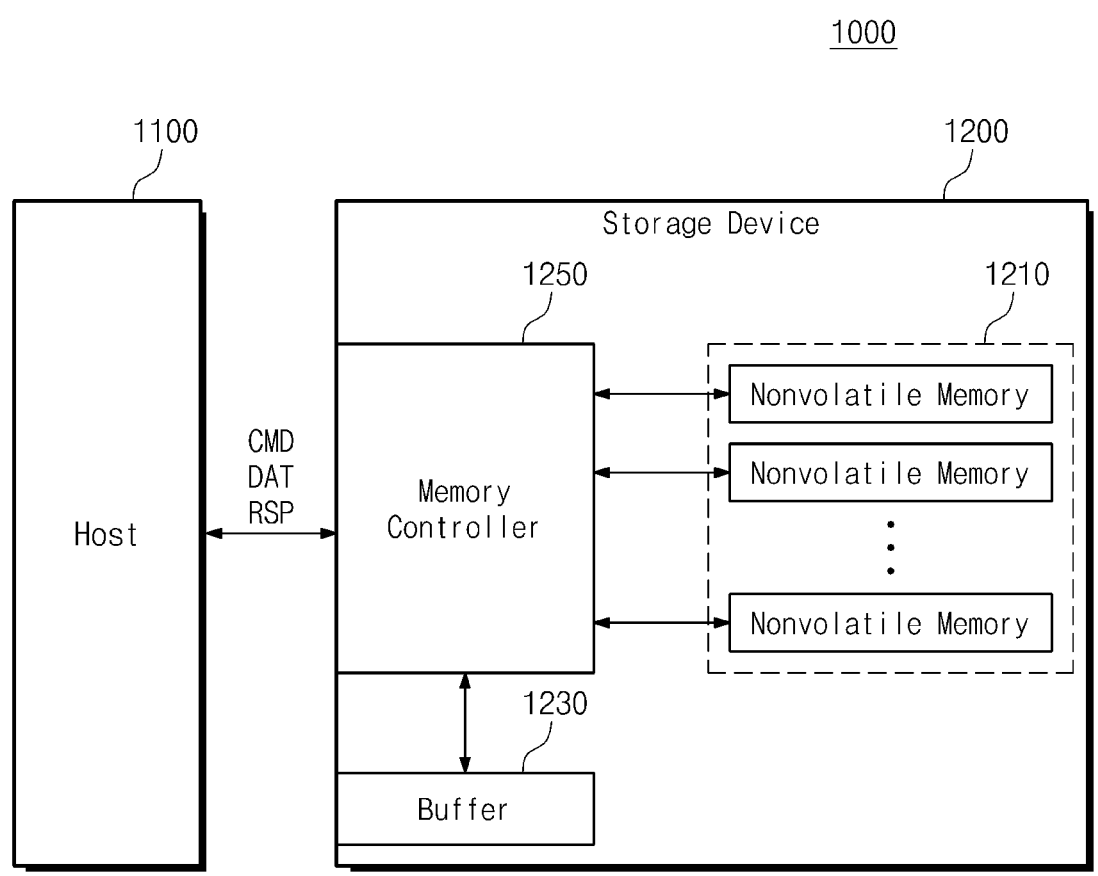
FIG. 1 is a block diagram illustrating a storage system including a storage device according to an embodiment.

FIG. 1 is a block diagram illustrating a storage system including a storage device according to an embodiment. A storage system 1000 may include a host 1100 and a storage device 1200.

The host 1100 may be configured to provide a command CMD to the storage device 1200. The host 1100 may be configured to exchange data DAT with the storage device 1200. The host 1100 may be configured to receive a response RSP from the storage device 1200.

In one example of a communication between the host 1100 and the storage device 1200, when the data DAT includes write data, the host 1100 may be configured to provide the storage device 1200 with the command CMD including a write command and the data DAT including the write data. The host 1100 may be configured to recognize that the write data is stored in the storage device 1200 based on the response RSP provided from the storage device 1200. In another example, when the data DAT includes read data, the host 1100 may be configured to provide the command CMD including a read command to the storage device 1200. The host 1100 may be configured to receive the data DAT including the read data from the storage device 1200. Accordingly, the storage system 1000 may be configured to provide a storage service to a user.

In some embodiments, the host 1100 may be implemented to include one or more processor cores. In particular embodiments, the host 1100 may include a general-purposed processor, a special-purposed processor, and/or an application processor. The host 1100 may be a processor itself, or may be an electronic device or system including a processor. In other embodiments, the host 1100 may be any electronic device that may be coupled to the storage device 1200 through any of the communication links described below and configured to store data on the storage device 1200.

The storage device 1200 may include one or more nonvolatile memories 1210, a buffer 1230, and a memory controller 1250. Each of the nonvolatile memories 1210 may include a memory region for storing the data DAT provided from the host 1100. In some example embodiments, when each of the nonvolatile memories 1210 includes a NAND-type flash memory, each of the nonvolatile memories 1210 may include a memory cell array formed along multiple word lines and multiple bit lines.

However, the above example embodiment does not limit the present disclosure. Each of the nonvolatile memories 1210 may include one or more of various nonvolatile memories such as a phase-change random access memory (PRAM), a magneto-resistive RAM (MRAM), a resistive RAM (ReRAM), a ferroelectric RAM (FRAM), a nanofloating gate memory (NFGM), or a polymer random access memory (PoRAM), and/or the like. A configuration of each of the nonvolatile memories 1210 may be the same or different within a single storage device 1200.

The buffer 1230 may be configured to temporarily store data to be stored in the nonvolatile memories 1210. For example, the buffer 1230 may be configured to buffer the data DAT provided from the host 1100. The data DAT may then be provided from the buffer 1230 to the nonvolatile memories 1210. In some embodiments, the buffer 1230 may operate as a cache memory of the storage device 1200.

In some embodiments, the buffer 1230 may include one or more of various volatile memories such as a static RAM (SRAM), a dynamic RAM (DRAM), a synchronous DRAM (SDRAM), and/or the like. However, other embodiments are not limited thereto. The buffer 1230 may be implemented with other types of memories that are randomly accessible and capable of operating at high speed.

In some embodiments, the host 1100 may be configured to provide the storage device 1200 with the command CMD including a "flush command" to flush data being temporarily buffered in the buffer 1230 to the nonvolatile memories 1210. In some embodiments, when communication between the host 1100 and the storage device 1200 is interrupted, the data that is temporarily stored in the buffer 1230 may be provided to the nonvolatile memory 1210 without a flush command provided from the host 1100. Such embodiments will be described in detail below.

In FIG. 1, the storage device 1200 is illustrated as including the buffer 1230. However, other embodiments are not limited to the configuration illustrated in FIG. 1. In some embodiments, the buffer 1230 may be separate from the storage device 1200. In some embodiments, another memory included in an electronic device/system employing the storage system 1000 may be used as the buffer 1230. In some embodiments, the buffer 1230 may be included in the memory controller 1250.

The memory controller 1250 may be configured to control the overall operations of the storage device 1200. The memory controller 1250 may be configured to control the nonvolatile memories 1210 and the buffer 1230. Under the control of the memory controller 1250, the data DAT provided from the host 1100 or the data being temporarily stored in the buffer 1230 may be stored in the nonvolatile memories 1210, or the data stored in the nonvolatile memories 1210 may be provided to the host 1100.

In some embodiments, the host 1100 and the storage device 1200 may be configured to communicate with each other in compliance with one or more of various interface protocols, such as universal serial bus (USB), small computer system interface (SCSI), peripheral component interconnect express (PCIe), nonvolatile memory express (NVMe), mobile PCIe (M-PCIe), advanced technology attachment (ATA), parallel ATA (PATA), serial ATA (SATA), serial attached SCSI (SAS), integrated drive electronics (IDE), universal flash storage (UFS), Firewire, and/or the like. In other embodiments, the host 1100 and the storage device 1200 may each be configured to communicate over a memory bus, such as a bus between a processor and system memory. In yet other embodiments, the host 1100 and the storage device 1200 may each be configured to communicate over a communication network such as an Ethernet network, a Fibre Channel network, the Internet, or the like. The host 1100 and the storage device 1200 may be configured to communicate the associated command CMD, data DAT, and response RSP as appropriate for the particular communication link/interface used.

In some embodiments, when the communication between the host 1100 and the storage device 1200 does not occur during a reference time duration, the data being temporarily stored in the buffer 1230 may be stored in the nonvolatile memories 1210 (i.e., "flushed" to the nonvolatile memories 1210) under the control of the memory controller 1250. As described above, such a "flush operation" may be performed without the flush command provided from the host 1100. Particular embodiments will be described below.

Figure 2:
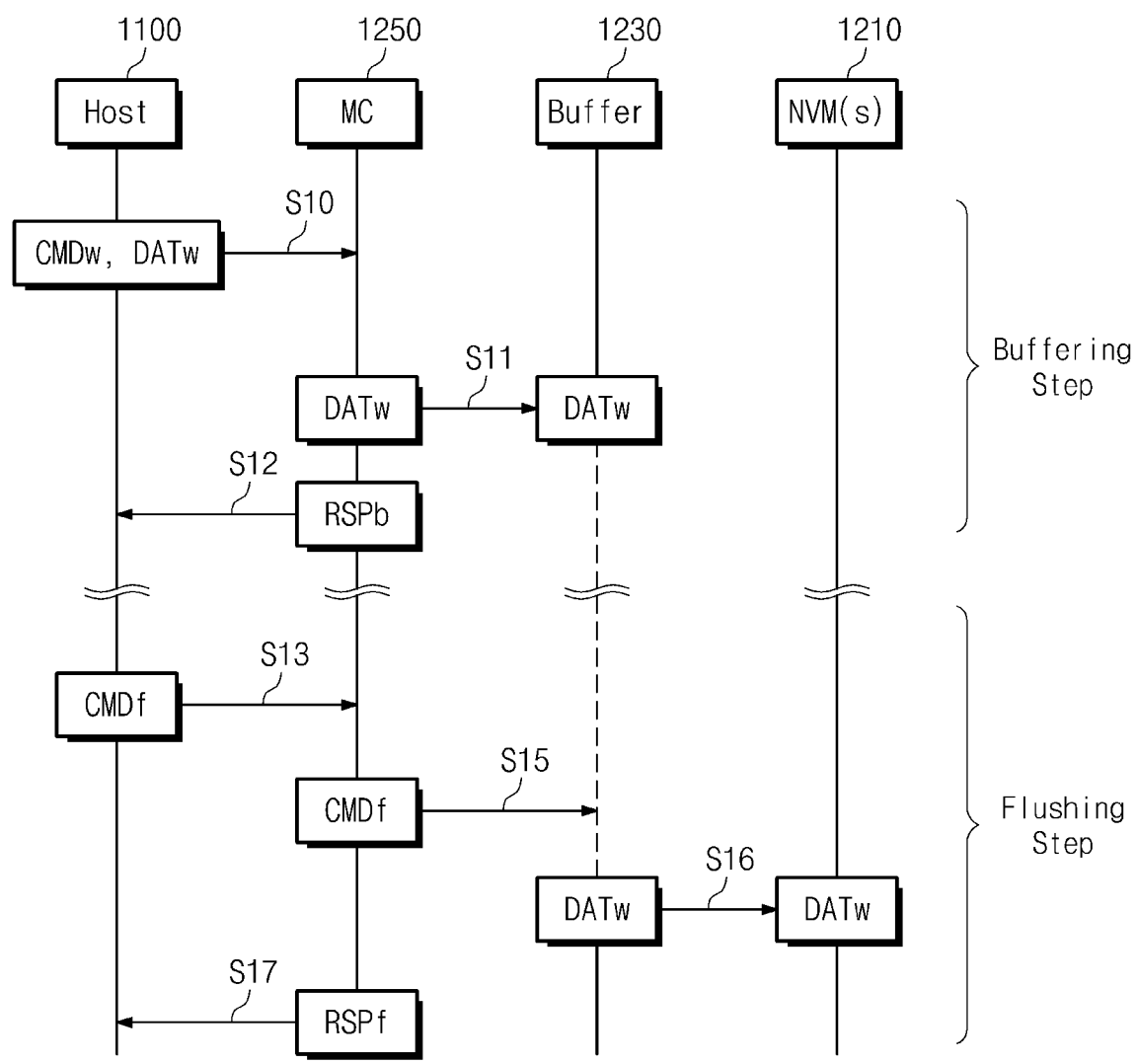
FIG. 2 is a flowchart describing example operations performed in a storage system of FIG. 1.

FIG. 2 is a flowchart describing example operations performed in a storage system of FIG. 1. Example operations described in FIG. 2 may be related to temporarily buffering data provided from the host 1100 in the buffer 1230 and then storing the buffered data in the nonvolatile memories 1210, instead of immediately storing data provided from the host 1100 in the nonvolatile memories 1210. The example operations described in FIG. 2 may include a "buffering" step and a "flushing" step.

In operation S10, the host 1100 may provide a write command CMDw to the memory controller 1250. The host 1100 may provide the memory controller 1250 with write data DATw corresponding to the write command CMDw.

In operation S11, the memory controller 1250 may provide the write data DATw to the buffer 1230 based on the write command CMDw. The buffer 1230 may temporarily buffer the write data DATw under the control of the memory controller 1250.

When the buffer 1230 stores the write data DATw, in operation S12, the memory controller 1250 may provide a buffering response RSPb to the host 1100. The host 1100 may recognize that storing the write data DATw is completed, based on the buffering response RSPb.

Operations S10 to S12 may be part or all of the buffering step; however, in other embodiments, additional steps may be performed. In the buffering step, the write data DATw provided from the host 1100 may be temporarily stored in the buffer 1230, and the host 1100 may complete a write request based on the buffering response RSPb.

Afterwards, in operation S13, the host 1100 may provide a flush command CMDf to the memory controller 1250. The flush command CMDf may be used to flush the write data DATw that is temporarily stored in the buffer 1230 to the nonvolatile memories 1210. In some embodiments, the buffer 1230 may include a volatile memory. Accordingly, to preserve the write data DATw regardless of a state of a power supply, the write data DATw may be stored in the nonvolatile memories 1210 (i.e., flushed to the nonvolatile memories 1210) in response to the flush command CMDf. For example, the host 1100 may provide the flush command CMDf to the memory controller 1250, based on the available capacity and performance of the buffer 1230.

In operation S15, the memory controller 1250 may control the buffer 1230 and the nonvolatile memories 1210 based on the flush command CMDf. In operation S16, the buffer 1230 may flush the write data DATw stored in the buffer 1230 to the nonvolatile memories 1210 under the control of the memory controller 1250, and the nonvolatile memories 1210 may store that write data DATw under the control of the memory controller 1250.

When the nonvolatile memories 1210 stores the write data DATw, in operation S17, the memory controller 1250 may provide a flush response RSPf to the host 1100. The host 1100 may recognize that the write data DATw is stored in the nonvolatile memories 1210, based on the flush response RSPf.

Operations S13 to S17 may be part or all of the flushing step. In the flushing step, the write data DATw may be finally stored in the nonvolatile memories 1210, and the flush operation may be completed based on the flush response RSPf.

As described with reference to FIG. 2, the memory controller 1250 may control the write operation accompanying the flush operation. In view of the host 1100, the performance may seem to be improved when the write data DATw is stored in the buffer 1230, comparing to immediately storing the write data DATw in the nonvolatile memories 1210.

Of course, in some cases, the memory controller 1250 may control a write operation for immediately storing the write data DATw in the nonvolatile memories 1210 without buffering the write data DATw in the buffer 1230, according to a request of the host 1100. For example, the manner of the write operation may be selected based on a policy of the host 1100.

Although buffering the write data DATw and flushing the write data DATw have been described as being performed by the buffer 1230 under control of the memory controller 1250, in other embodiments, the memory controller 1250 may have a different role. For example, the memory controller 1250 may merely instruct the buffer 1230 to store the write data DATw in the nonvolatile memories 1210.

Figure 3:
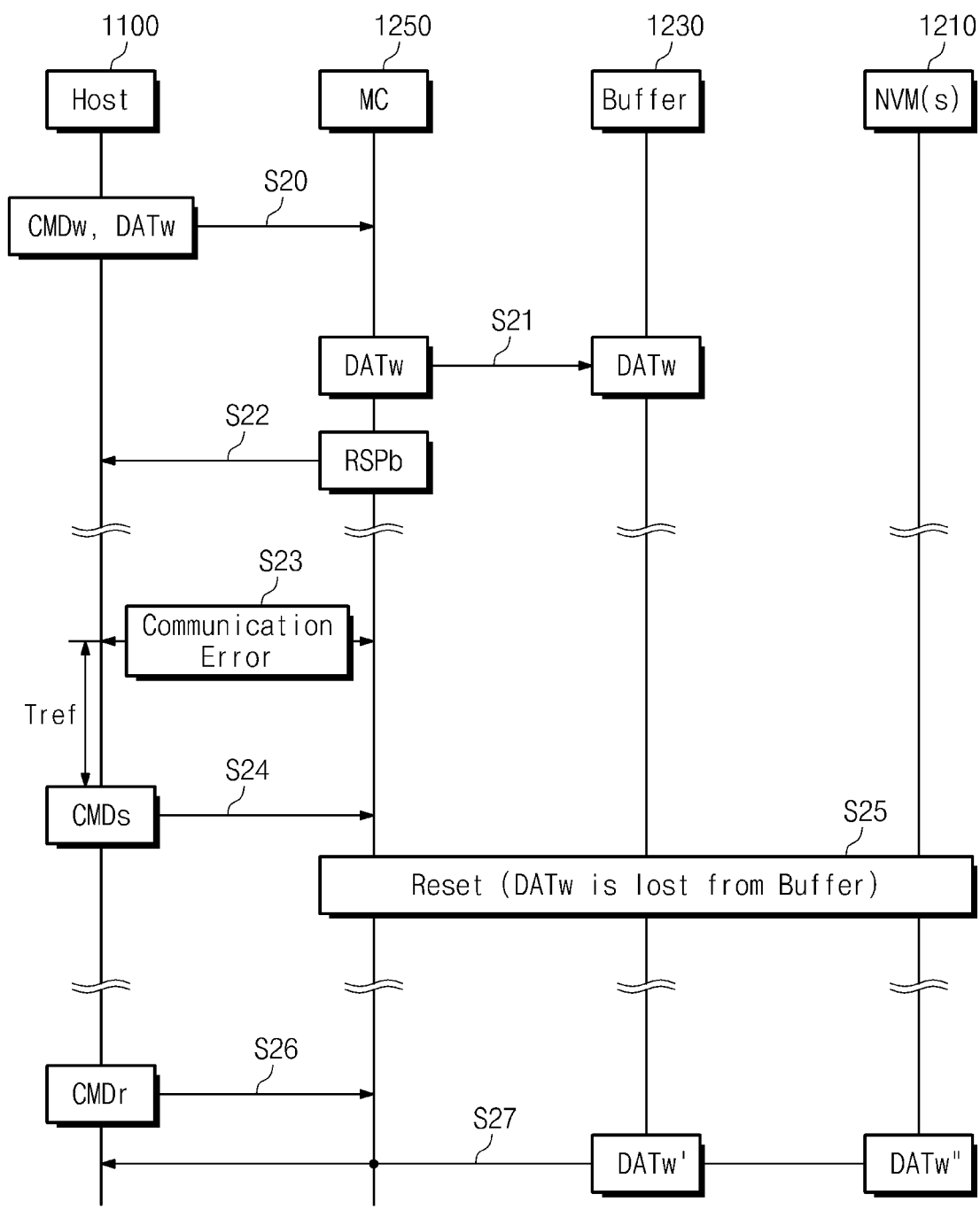
FIG. 3 is a flowchart describing a case where data stored in a buffer is lost as communication between a host and a storage device is interrupted.

FIG. 3 is a flowchart describing a case where data stored in a buffer is lost as communication between a host and a storage device is interrupted. The case described in FIG. 3 may be related to temporarily buffering data provided from the host 1100 in the buffer 1230.

Similarly as described with reference to FIG. 2, operations S20 to S22 may be part or all of a buffering step. In operation S20, the host 1100 may provide the memory controller 1250 with a write command CMDw and write data DATw corresponding to the write command CMDw. In operation S21, the buffer 1230 may temporarily store the write data DATw under the control of the memory controller 1250. In operation S22, the memory controller 1250 may provide the buffering response RSPb to the host 1100 in response to storing the write data DATw in the buffer 1230. The host 1100 may recognize that storing the write data DATw is completed, based on the buffering response RSPb.

Afterwards, before a flush operation is performed, in operation S23, an error may occur in interfacing between the host 1100 and the memory controller 1250. When the error occurs, communication between the host 1100 and the memory controller 1250 may be interrupted. For example, due to the interfacing error, data output from the host 1100 may not be provided to the memory controller 1250, or a response output from the memory controller 1250 may not be provided to the host 1100. In some cases, due to the interfacing error, a command output from the host 1100 may not be provided to the memory controller 1250.

When the interfacing error occurs, a "recovery scheme" may operate according to an interface protocol that is employed for communication between the host 1100 and the memory controller 1250. The recovery scheme may operate to resolve the interrupted communication between the host 1100 and the memory controller 1250. However, in some cases, even though the recovery scheme is performed, the error may not be completely recovered and the communication may not occur.

In some embodiments, when the communication between the host 1100 and the memory controller 1250 does not occur during a reference time duration Tref, in operation S24, the host 1100 may output a reset command CMDs. The reset command CMDs may be output to reset an operation of the storage device 1200 of FIG. 1 including the one or more nonvolatile memories 1210, the buffer 1230, and the memory controller 1250.

In operation S25, an operation of at least one of the nonvolatile memories 1210, the buffer 1230, the memory controller 1250, and any combination thereof may be reset in response to the reset command CMDs. When an operation of the storage device 1200 is reset, operating states of components included in the storage device 1200 may be initialized as if the storage device 1200 is powered off and then powered on again. Accordingly, a cause of the communication error may be removed, and the communication between the host 1100 and the memory controller 1250 may be resumed.

However, as described above, in some embodiments, the buffer 1230 may include a volatile memory. Due to this reason, when an operation of the buffer 1230 is reset before the flush operation is performed, the write data DATw temporarily stored in the buffer 1230 may be lost. Such data loss may degrade the reliability of the storage device 1200.

For example, in operation S26, the host 1100 may provide a read command CMDr to the memory controller 1250, to read the write data DATw. However, because the write data DATw that was temporarily stored in the buffer 1230 is lost, no data may be read. In some cases, in operation S27, garbage data (i.e., DATw or DATw') that is different from the intended write data DATw may be read from the buffer 1230 or the nonvolatile memories 1210.

When the intended write data DATw is not read, the host 1100 may operate abnormally. In the worst case, failure may occur in integrity test by the host 1100, and an operation of the host 1100 may be completely stopped (so-called "kernel panic"). Accordingly, a user may suffer damage.

In some embodiments, to prevent the write data DATw from being lost due to the communication interruption, the communication error may be predicted, and the write data DATw buffered in the buffer 1230 may be flushed to the nonvolatile memories 1210 in advance. Particular embodiments will be described below.

Figure 4:
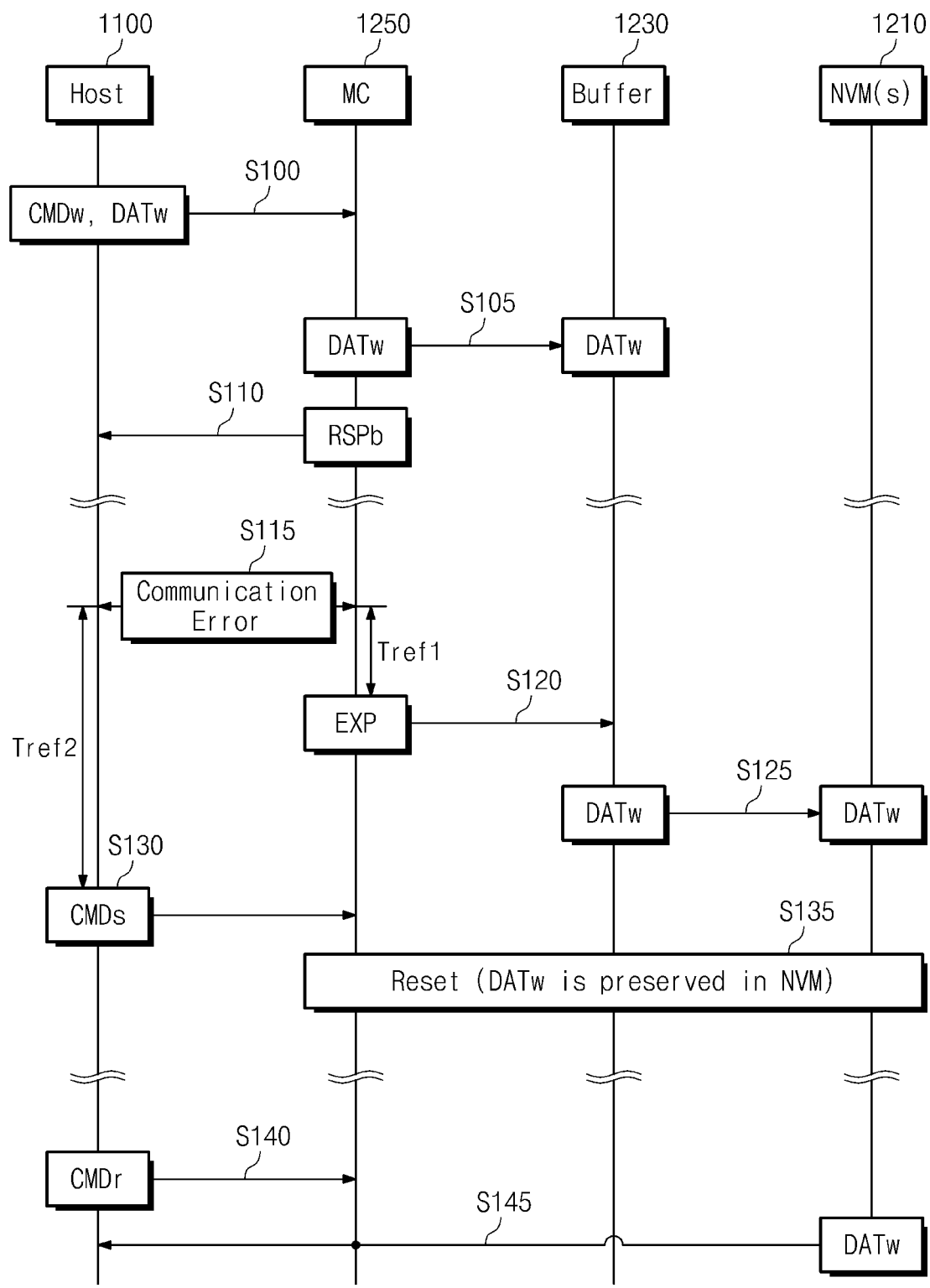
FIG. 4 is a flowchart describing operations for preserving data stored in a buffer of a storage device of FIG. 1 according to an embodiment.

FIG. 4 is a flowchart describing operations for preserving data stored in a buffer of a storage device of FIG. 1 according to an embodiment.

Similarly as described with reference to FIG. 2, operations S100 to S110 may be part or all of a buffering step. In operation S100, the host 1100 may provide the memory controller 1250 with a write command CMDw and write data DATw corresponding to the write command CMDw. In operation S105, the buffer 1230 may temporarily store the write data DATw under the control of the memory controller 1250. In operation S110, the memory controller 1250 may provide a buffering response RSPb to the host 1100 in response to storing the write data DATw in the buffer 1230. The host 1100 may recognize that storing the write data DATw is completed, based on the buffering response RSPb.

Afterwards, before a flush operation is performed, in operation S115, an error may occur in interfacing between the host 1100 and the memory controller 1250. When the error occurs, communication between the host 1100 and the memory controller 1250 may be interrupted. Accordingly, the memory controller 1250 may not receive a command or data from the host 1100. In some cases, the memory controller 1250 may not transmit a response to the host 1100. Other types of communication errors may occur.

In some embodiments, when the communication with the host 1100 does not occur during a first reference time duration Tref1, the memory controller 1250 may control the buffer 1230 and the nonvolatile memories 1210 such that the write data DATw being temporarily stored in the buffer 1230 is flushed to the nonvolatile memories 1210. That is, even though the flush command CMDf (refer to FIG. 2) is not provided from the host 1100, the flush operation may be performed in advance under the control of the memory controller 1250.

When the communication with the host 1100 is interrupted during the first reference time duration Tref1, it is likely that a communication error occurs. Accordingly, in some embodiments, the memory controller 1250 may predict that the error occurs, and may control the buffer 1230 and the nonvolatile memories 1210 such that the write data DATw is flushed before the reset command CMDs is provided from the host 1100. According to these example embodiments, because the write data DATw is stored in the nonvolatile memories 1210, losing the write data DATw due to the reset command CMDs may be prevented.

As will be described below, in some embodiments, the storage device 1200 of FIG. 1 may include a timer. The timer may be provided to determine whether the first reference time duration Tref1 elapses after the communication is interrupted. In operation S120, the timer may generate an expiration signal EXP in response to a lapse of the first reference time duration Tref1. The expiration signal EXP may indicate that the first reference time duration Tref1 elapses after the communication is interrupted.

In operation S125, the write data DATw that is temporarily stored in the buffer 1230 may be flushed to the nonvolatile memories 1210 based on the expiration signal EXP. Accordingly, before an operation of the storage device 1200 is reset, the write data DATw may be preserved in the nonvolatile memories 1210.

Afterwards, when the communication between the host 1100 and the memory controller 1250 does not occur during a second reference time duration Tref2, in operation S130, the host 1100 may output the reset command CMDs. In operation S135, an operation of at least one of the nonvolatile memories 1210, the buffer 1230, the memory controller 1250, and any combination thereof may be reset in response to the reset command CMDs. However, unlike the example of FIG. 3, the write data DATw may not be lost.

Accordingly, when the host 1100 provides the read command CMDr to the memory controller 1250 to read the write data DATw in operation S140, the write data DATw stored in the nonvolatile memories 1210 may be normally read in operation S145. The host 1100 may normally operate based on the intended write data DATw. To this end, the first reference time duration Tref1 may be set to be shorter than the second reference time duration Tref2. Setting the first reference time duration Tref1 will be described below.

According to some embodiments, the storage device 1200 may predict whether an error occurs in the communication with the host 1100, based on a lapse of the first reference time duration Tref1. Furthermore, before the storage device 1200 is reset by the reset command CMDr of the host 1100 after a lapse of the second reference time duration Tref2, the storage device 1200 may preserve the write data DATw that is buffered in the buffer 1230 in the nonvolatile memories 1210. Accordingly, loss of the write data DATw may be prevented, and reliability of the storage device 1200 may be improved.

Figure 5:
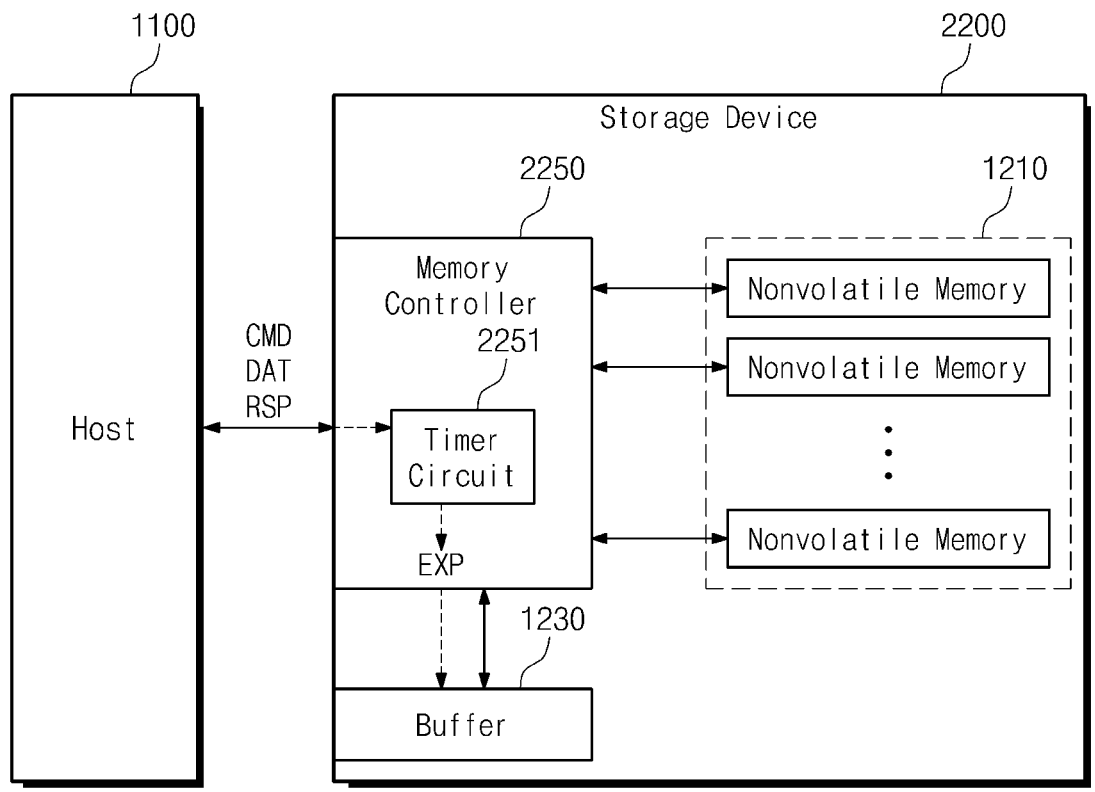
FIG. 5 is a block diagram illustrating a storage system including a storage device according to an embodiment.

FIG. 5 is a block diagram illustrating a storage system including a storage device according to an embodiment. A storage system 2000 may include a host 1100 and a storage device 2200. The storage device 2200 may include one or more nonvolatile memories 1210, a buffer 1230, and a memory controller 2250.

Configurations and operations of the host 1100, the nonvolatile memories 1210, and the buffer 1230 have been described with reference to FIG. 1. The storage device 2200 and the memory controller 2250 may be configured and may operate identically or similarly to the storage device 1200 and the memory controller 1250, respectively, described with reference to FIGS. 1 to 4. For brevity, redundant descriptions associated with the host 1100, the storage device 2200, the nonvolatile memories 1210, the buffer 1230, and the memory controller 2250 will be omitted below.

In some embodiments, the memory controller 2250 may include a timer circuit 2251. The timer circuit 2251 may be configured to generate an expiration signal EXP when communication between the host 1100 and the memory controller 2250 does not occur during a reference time duration (e.g., the first reference time duration Tref1 of FIG. 4). The expiration signal EXP may indicate that the first reference time duration Tref1 elapses after the communication is interrupted. The memory controller 2250 may control the nonvolatile memories 1210 and the buffer 1230 based on the expiration signal EXP.

When the communication with the host 1100 is interrupted during the first reference time duration Tref1, it is likely that a communication error has occurred. In some embodiments, as described with reference to FIG. 4, the memory controller 2250 may be configured to control the nonvolatile memories 1210 and the buffer 1230 such that data stored in the buffer 1230 is flushed to the nonvolatile memories 1210 based on the expiration signal EXP. Accordingly, data loss may be prevented.

The timer circuit 2251 may be implemented in hardware. Alternatively, some or whole portion of operations of the timer circuit 2231 may be implemented in software. The hardware implementation may include various analog circuits and/or logic circuits to count a lapse of time, reset/load the timer circuit 2251, generate the expiration signal EXP, or the like. The software implementation may include an instruction code that is executed by the memory controller 2250. Implementing functions of timer is well known to those skilled in the art, and detailed descriptions will be omitted below.

In FIG. 5, it is illustrated that the memory controller 2250 includes the timer circuit 2251. However, other embodiments are not limited to the configuration illustrated in FIG. 5. In some embodiments, the timer circuit 2251 may be provided separately from the memory controller 2250 inside the storage device 2200. In some other embodiments, the timer circuit 2251 may be provided separately from the storage device 2200.

Figure 6:
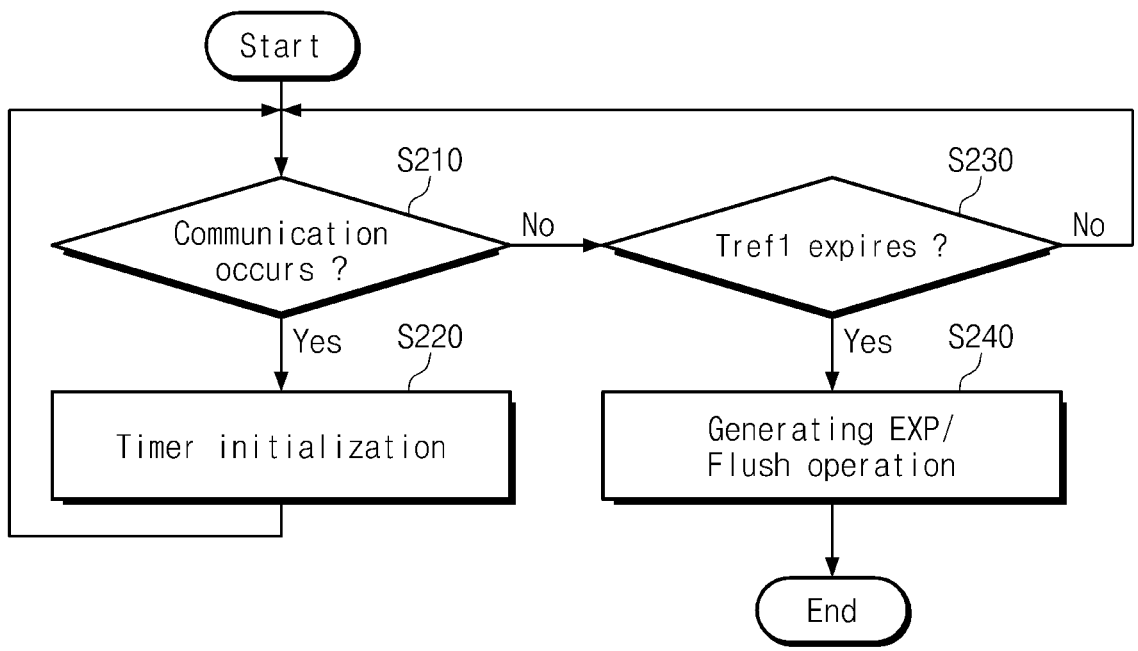
FIG. 6 is a flowchart describing an operation of a storage device of FIG. 5.

FIG. 6 is a flowchart describing an operation of a storage device of FIG. 5. To help better understanding, FIG. 5 will be referred together with FIG. 6.

An operation described in FIG. 6 may start with communication between the host 1100 and the storage device 2200. When an error does not occur in interfacing between the host 1100 and the storage device 2200, a command CMD, data DAT, and a response RSP may be normally exchanged between the host 1100 and the storage device 2200.

In operation S210, it may be determined whether the communication occurs between the host 1100 and the storage device 2200. Determination of operation S210 may be performed by the timer circuit 2251 and/or the memory controller 2250. For example, the memory controller 2250 may transmit a signal to the timer circuit 2251 indicating that communication has occurred after receiving or transmitting a command CMD, data DAT, or a response RSP.

When the communication occurs between the host 1100 and the storage device 2200, in operation S220, an operation of timer circuit 2251 may be initialized. For example, when the timer circuit 2251 is configured to count a value that increases from '0', a timer of the timer circuit 2251 may be initialized to have a value of '0' in operation S220. Alternatively, when the timer circuit 2251 is configured to count a value that starts from a value of the first reference time duration Tref1 and decreases to '0', a timer of the timer circuit 2251 may be initialized to have the value of the first reference time duration Tref1 in operation S220.

In some embodiments, when the communication does not occur during the first reference time duration Tref1, a flush operation may be performed in advance to preserve data that is temporarily stored in the buffer 1230. However, when the communication is performed normally, the flush operation may not be required. Accordingly, counting on a lapse of time may be initialized in operation S220.

On the other hand, when the communication does not occur between the host 1100 and the storage device 2200, the timer circuit 2251 may operate without initialization. Accordingly, in operation S230, it may be determined whether the first reference time duration Tref1 expires. Determination of operation S230 may be performed by the timer circuit 2251 and/or the memory controller 2250. When the first reference time duration Tref1 does not expire yet, it may be determined whether the communication occurs in operation S210.

Meanwhile, when the first reference time duration Tref1 expires or elapses while the communication does not occur between the host 1100 and the storage device 2200, it is likely that an error has occurred. For example, the timer circuit 2251 may reach a value of '0' or Tref1 depending on the configuration of the timer circuit 2251. In this case, in operation S240, the timer circuit 2251 may generate the expiration signal EXP. Furthermore, data temporarily stored in the buffer 1230 may be flushed to the nonvolatile memories 1210 based on the expiration signal EXP. Accordingly, data loss may be prevented.

Figure 7:
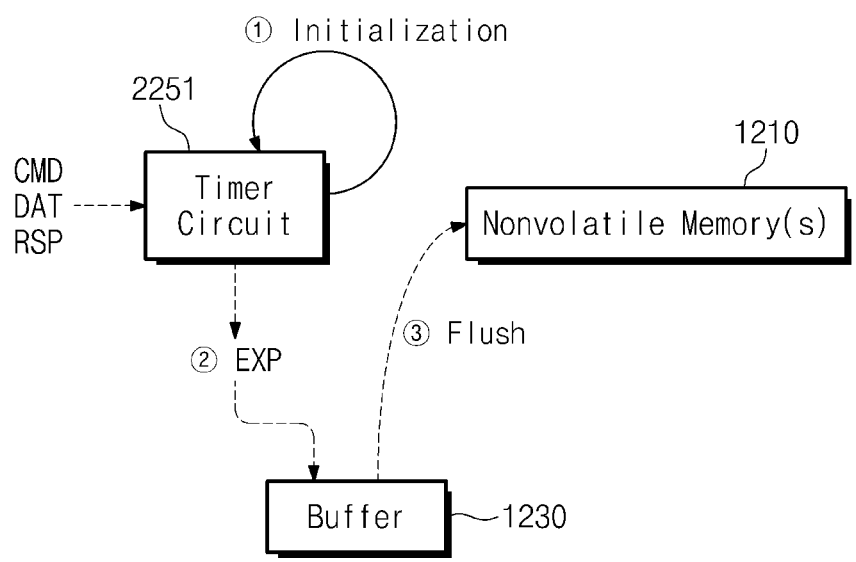
FIG. 7 is a conceptual diagram for describing an operation of a storage device of FIG. 5.

FIG. 7 is a conceptual diagram for describing an operation of a storage device of FIG. 5. To help better understanding, FIG. 5 will be referred together with FIG. 7.

The timer circuit 2251 may operate based on whether the command CMD, the data DAT, and the response RSP are exchanged between the host 1100 and the storage device 2200. When communication occurs between the host 1100 and the storage device 2200, an operation of the timer circuit 2251 may be initialized (operation ①). On the other hand, when the communication between the host 1100 and the storage device 2200 does not occur during a reference time duration (e.g., the first reference time duration Tref1 of FIG. 4), the timer circuit 2251 may generate an expiration signal EXP (operation ②).

When the expiration signal EXP is generated, data that is temporarily stored in the buffer 1230 may be flushed to the nonvolatile memories 1210 (operation ③). Accordingly, even though an operation of the storage device 2200 is reset by the reset command CMDs (refer to FIG. 4) output from the host 1100, data loss may be prevented.

Figure 8:
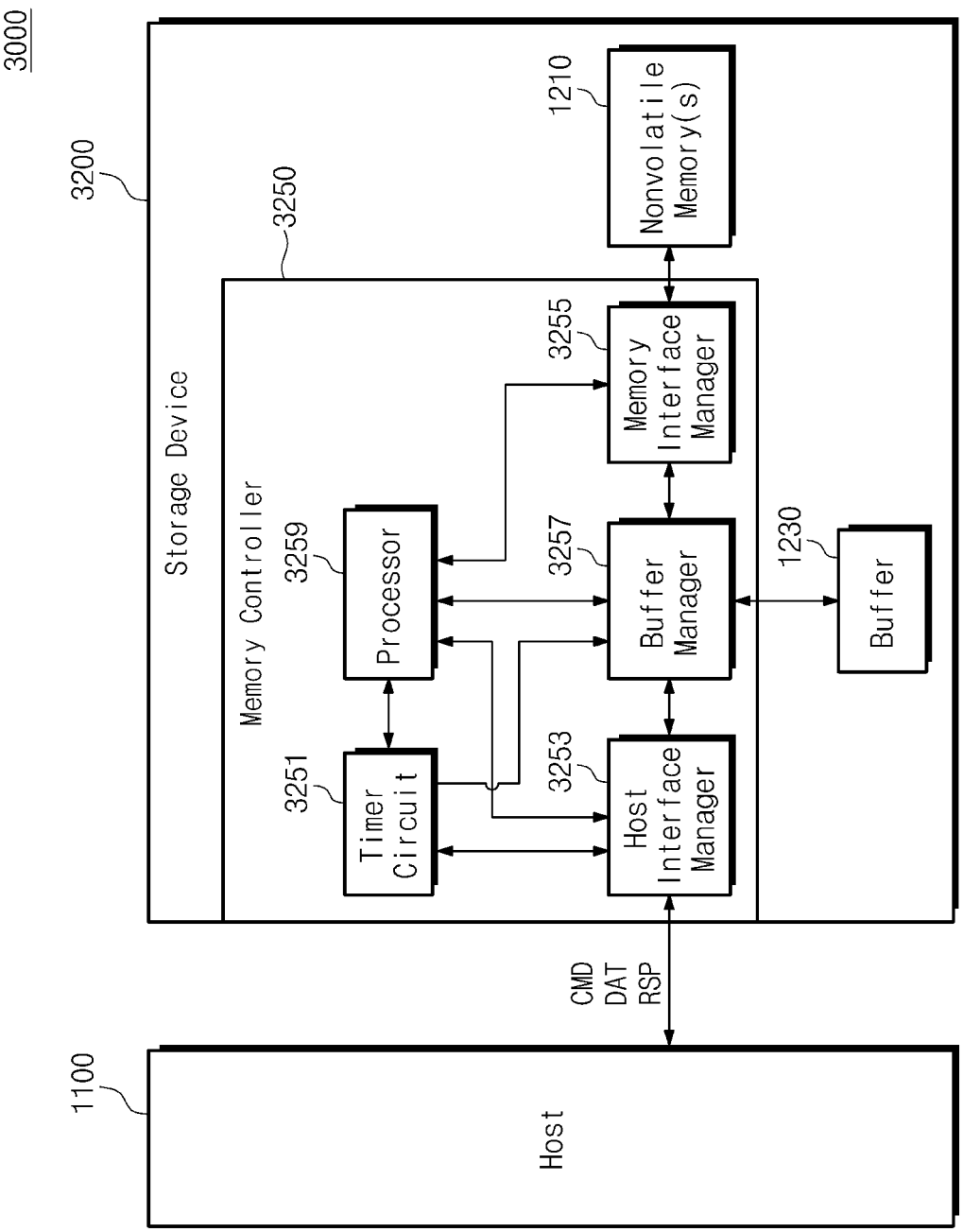
FIG. 8 is a block diagram illustrating a storage system including a storage device according to an embodiment.

FIG. 8 is a block diagram illustrating a storage system including a storage device according to an example embodiment. A storage system 3000 may include a host 1100 and a storage device 3200. The storage device 3200 may include one or more nonvolatile memories 1210, a buffer 1230, and a memory controller 3250.

Configurations and operations of the host 1100, the nonvolatile memories 1210, and the buffer 1230 have been described with reference to FIG. 1. The storage device 3200 and the memory controller 3250 may be configured and may operate identically or similarly to the storage device 1200 and the memory controller 1250, respectively, described with reference to FIGS. 1 to 4. A timer circuit 3251 may be configured and may operate identically or similarly to the timer circuit 2251 described with reference to FIG. 5. For brevity, redundant descriptions associated with the host 1100, the storage device 3200, the nonvolatile memories 1210, the buffer 1230, the memory controller 3250, and the timer circuit 3251 will be omitted below.

In some embodiments, the memory controller 3250 may include a host interface manager 3253, a memory interface manager 3255, a buffer manager 3257, and a processor 3259. The timer circuit 3251 may be included in the memory controller 3250 as illustrated in FIG. 8. Alternatively, the timer circuit 3251 may be provided separately from the memory controller 3250.

The host interface manager 3253 may be configured to process interfacing with the host 1100. For example, the host interface manager 3253 may include an interface circuit for communicating with the host 1100. For example, the host interface manager 3253 may include a command parser for parsing the command CMD provided from the host 110.

The memory interface manager 3255 may be configured to process interfacing with the nonvolatile memories 1210. For example, the memory interface manager 3255 may include a stream buffer for managing data streams. For example, a flash translation layer may be provided in the memory interface manager 3255, to properly process data between the host interface manager 3253 and the memory interface manager 3255.

The buffer manager 3257 may be configured to manage an operation of the buffer 1230. For example, the buffer manager 3257 may control the buffer 1230 such that the data DAT provided from the host 1100 is temporarily stored in the buffer 1230. The buffer manager 3257 may flush data temporarily stored in the buffer 1230 to the nonvolatile memories 1210.

The processor 3259 may be configured to perform various arithmetic operations and/or logical operations to process the overall operations of the memory controller 3250. The processor 3259 may be configured to perform operations for operating at least one of the host interface manager 3253, the memory interface manager 3255, the buffer manager 3257, and any combination thereof. In some embodiments, the processor 3259 may be configured to perform operations to control the timer circuit 3251.

The processor 3259 may include one or more processor cores configured to perform an arithmetic operation and/or a logical operation. For example, the processor 3259 may include one processor core (i.e., single core) or may include two or more processor cores (i.e., multi-core). The number of processor cores may be variously changed or modified, considering usage, performance, and size of the storage device 3200. In other embodiments, the processor 3259 may be implemented with multiple processors.

Components included in the memory controller 3250 may be connected to each other and may communicate with each other. Example embodiments may be variously modified according to communication of the components included in the memory controller 3250. Hereinafter, some further embodiments will be described.

Figure 9:
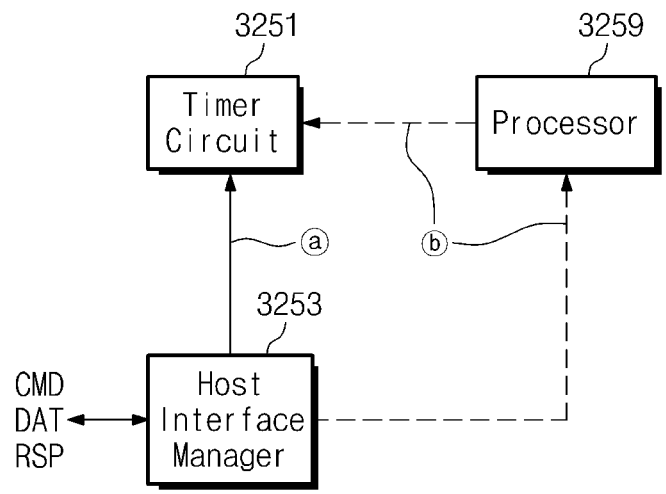
FIG. 9 is a conceptual diagram for describing a process of managing a timer circuit in a storage device of FIG. 8.

FIG. 9 is a conceptual diagram for describing a process of managing a timer circuit in a storage device of FIG. 8. To help better understanding, FIG. 8 will be referred together with FIG. 9.

When communication between the host 1100 and the storage device 3200 is performed normally, the host interface manager 3253 may exchange at least one of the command CMD, the data DAT, the response RSP, and any combination thereof with the host 1100. On the other hand, when the communication does not occur between the host 1100 and the storage device 3200, the host interface manager 3253 may not exchange the command CMD, the data DAT, and the response RSP with the host 1100.

In some embodiments, when the communication occurs between the host interface manager 3253 and the host 1100, the host interface manager 3253 may inform the timer circuit 3251 of the communication being occurred (path ⓐ). As described with reference to operation S220 of FIG. 6 and operation ① of FIG. 7, an operation of the timer circuit 3251 may be initialized in response to the communication being occurred. That is, in this embodiment, the timer circuit 3251 may manage its initialization by itself.

In some embodiments, when the communication occurs between the host interface manager 3253 and the host 1100, the host interface manager 3253 may inform the processor 3259 of the communication being occurred (path ⓑ). The processor 3259 may initialize an operation of the timer circuit 3251 in response to the communication being occurred (path ⓑ). That is, in this embodiment, the processor 3259 may execute some instructions and may perform various operations to manage initialization of the timer circuit 3251.

Meanwhile, when the communication does not occur between the host interface manager 3253 and the host 1100, the host interface manager 3253 may not inform the timer circuit 3251 and/or the processor 3259 of the communication being occurred. In this case, the timer circuit 3251 may operate without initialization. When a reference time duration (e.g., the first reference time duration Tref1 of FIG. 4) expires or elapses without initialization, the expiration signal EXP (refer to FIG. 7) may be generated.

Figure 10:
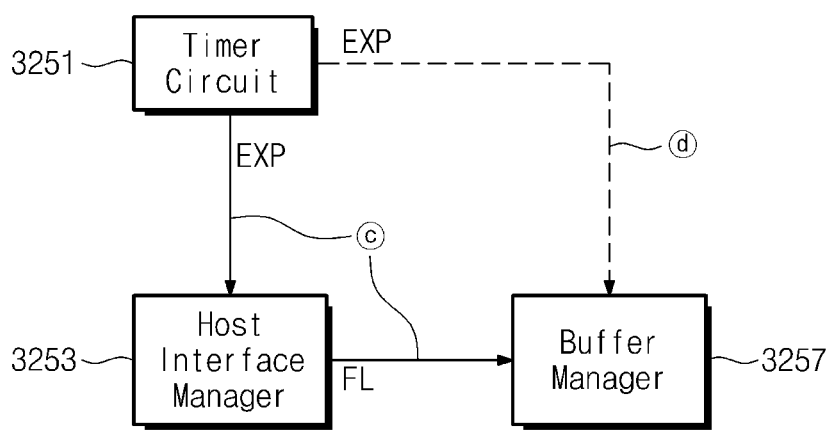
FIGS. 10 and 11 are conceptual diagrams for describing a process of performing a flush operation based on a lapse of a reference time duration in a storage device of FIG. 8.

FIG. 10 is a conceptual diagram for describing a process of performing a flush operation based on a lapse of a reference time duration in a storage device of FIG. 8. To help better understanding, FIG. 8 will be referred together with FIG. 10.

As described above, in some embodiments, when a reference time duration (e.g., the first reference time duration Tref1 of FIG. 4) expires or elapses, the timer circuit 3251 may generate an expiration signal EXP. The expiration signal EXP may indicate that the first reference time duration Tref1 elapses after communication is interrupted. Accordingly, data temporarily stored in the buffer 1230 may be flushed to the nonvolatile memories 1210 based on the expiration signal EXP.

In some embodiments, the expiration signal EXP generated by the timer circuit 3251 may be provided to the host interface manager 3253 (path ⓒ). The host interface manager 3253 may provide a flush signal FL to the buffer manager 3257 in response to the expiration signal EXP (path ⓒ). The buffer manager 3257 may control the buffer 1230 in response to the flush signal FL such that the data temporarily stored in the buffer 1230 is flushed to the nonvolatile memories 1210. For example, the host interface manager 3253 may operate as if the host interface manager 3253 receives the flush command CMDf (refer to FIG. 2) from the host 1100, in response to the expiration signal EXP.

In some embodiments, the expiration signal EXP generated by the timer circuit 3251 may be provided to the buffer manager 3257 (path ⓓ). The buffer manager 3257 may control the buffer 1230 in response to the expiration signal EXP such that the data temporarily stored in the buffer 1230 is flushed to the nonvolatile memories 1210. That is, in this embodiment, the buffer manager 3257 may directly receive the expiration signal EXP without intervention of the host interface manager 3253.

Figure 11:
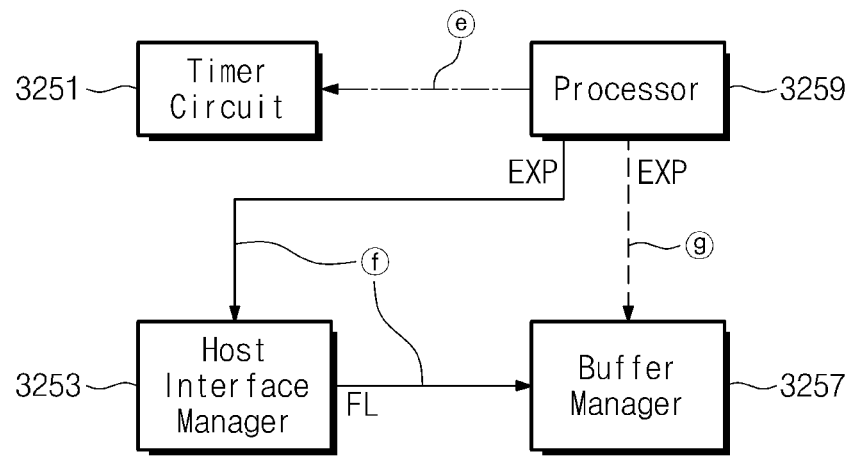

FIG. 11 is a conceptual diagram for describing a process of performing a flush operation based on a lapse of a reference time duration in a storage device of FIG. 8. To help better understanding, FIG. 8 will be referred together with FIG. 11.

Unlike those described above, in some embodiments, the timer circuit 3251 may not generate the expiration signal EXP. Instead, the processor 3259 may monitor an operation of the timer circuit 3251 (path ⓔ), and the processor 3259 may generate the expiration signal EXP based on whether a reference time duration (e.g., the first reference time duration Tref1 of FIG. 4) elapses in the timer circuit 3251. In such embodiments, the timer circuit 3251 may just count a lapse of time.

In some embodiments, the expiration signal EXP generated by the processor 3259 may be provided to the host interface manager 3253 (path ⓕ). The host interface manager 3253 may provide a flush signal FL to the buffer manager 3257 in response to the expiration signal EXP (path ⓕ). The buffer manager 3257 may control the buffer 1230 in response to the flush signal FL such that data temporarily stored in the buffer 1230 is flushed to the nonvolatile memories 1210.

In some embodiments, the expiration signal EXP generated by the processor 3259 may be provided to the buffer manager 3257 (path ⓖ). The buffer manager 3257 may control the buffer 1230 in response to the expiration signal EXP such that the data that is temporarily stored in the buffer 1230 is flushed to the nonvolatile memories 1210.

Above, various embodiments have been described. However, the above embodiments are provided to help better understanding, and other embodiments are not limited to the particular embodiments described above. Other embodiments may be variously changed or modified to flush the data that is temporarily stored in the buffer 1230 to the nonvolatile memories 1210 in response to expiration of the reference time duration before an operation of the storage device is reset.

Figure 12:
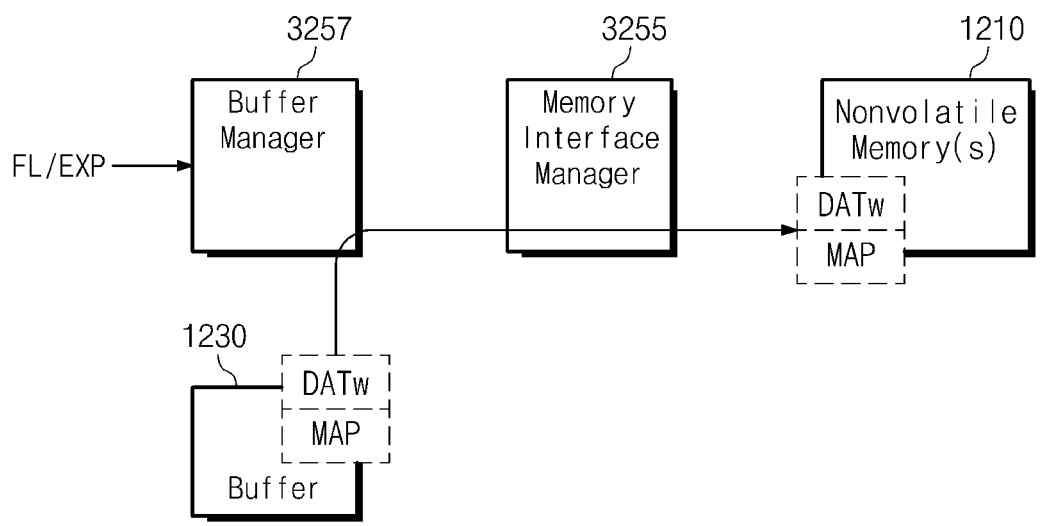
FIG. 12 is a conceptual diagram for describing a process of storing mapping data in a storage device of FIG. 8.

FIG. 12 is a conceptual diagram for describing a process of storing mapping data in a storage device of FIG. 8. To help better understanding, FIG. 8 will be referred together with FIG. 12.

In some embodiments, the buffer manager 3257 may receive the flush signal FL from the host interface manager 3253. In some embodiments, the buffer manager 3257 may receive the expiration signal EXP from the timer circuit 3251 and/or the processor 3259. The buffer manager 3257 may flush the write data DATw that was temporarily stored in the buffer 1230 to the nonvolatile memories 1210 through the memory interface manager 3255 in response to the flush signal FL and/or the expiration signal EXP.

When the write data DATw is flushed to the nonvolatile memories 1210, mapping data MAP may be stored in the nonvolatile memories 1210 under the control of the memory controller 3250. The mapping data MAP may include data associated with a correspondence relationship between the write data DATw and a memory location where the write data DATw is stored in the nonvolatile memories 1210. For example, the mapping data MAP may be stored as a mapping table that indicates a mapping relationship between a logical address of the memory location where the write data DATw is stored and the write data DATw corresponding to the logical address.

For example, the mapping data MAP may be generated by updating any existing mapping data related to memory locations of other data previously stored in the nonvolatile memories 1210. Alternatively, the mapping data MAP may be generated separately from the existing mapping data.

When the host 1100 requests access to the write data DATw, the mapping data MAP may be referred to by the memory controller 3250. For example, after an operation of the storage device 3200 is reset in response to the reset command CMDs (refer to FIG. 4), the mapping data MAP may be loaded to the buffer 1230. When the host 1100 requests to access to the write data DATw, the memory controller 3250 may understand the memory location where the write data DATw is stored with reference to the loaded mapping data MAP. Accordingly, the memory controller 3250 may provide the host 1100 with the data DAT including the write data DATw.

Figure 13:
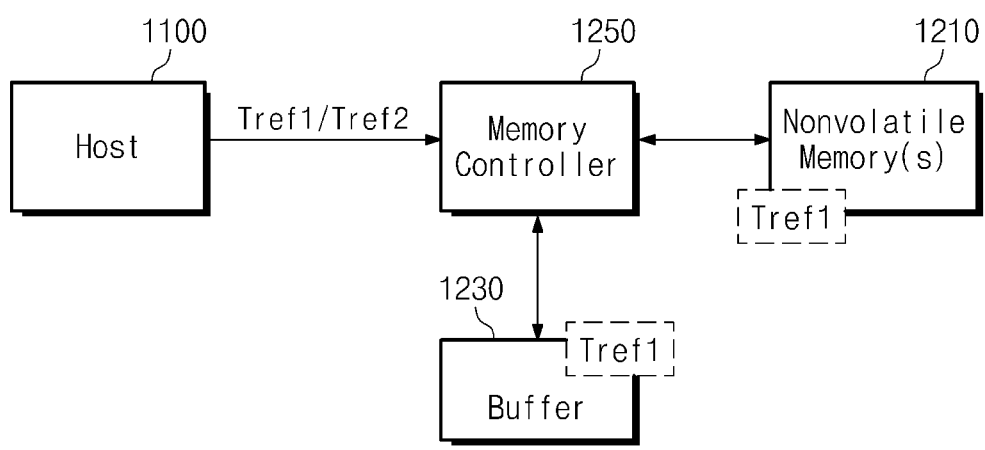
FIG. 13 is a conceptual diagram for describing a process of setting a value of a reference time duration in a storage device of FIG. 1.

FIG. 13 is a conceptual diagram for describing a process of setting a value of a reference time duration in a storage device of FIG. 1. To help better understanding, FIG. 1 will be referred together with FIG. 13.

As described above, the first reference time duration Tref1 may be used to flush data temporarily stored in the buffer 1230 to the nonvolatile memories 1210. For example, a value of the first reference time duration Tref1 may be stored in the nonvolatile memories 1210. In some embodiments, the memory controller 1250 may refer to the value of the first reference time duration Tref1 stored in the nonvolatile memories 1210. In some embodiments, the value of the first reference time duration Tref1 stored in the nonvolatile memories 1210 may be loaded to the buffer 1230, and then the memory controller 1250 may refer to the value of the first reference time duration Tref1 loaded to the buffer 1230.

The first reference time duration Tref1 may be set to be shorter than the second reference time duration Tref2 (refer to FIG. 4). This is because data temporarily stored in the buffer 1230 needs to be flushed to the nonvolatile memories 1210 before an operation of the storage device 1200 is reset by the reset command CMDs (refer to FIG. 4).

Accordingly, the value of the first reference time duration Tref1 may be determined considering time taken to perform any operation that needs to be performed before an operation of the storage device 1200 is reset. For example, the first reference time duration Tref1 may have a value that is smaller than or equal to a value obtained by subtracting a value of time taken to flush the data temporarily stored in the buffer 1230 to the nonvolatile memories 1210 and a value of time taken to complete execution of the command CMD that is not processed by the memory controller 1250 from the value of the second reference time duration Tref2. For example, the value of the second reference time duration Tref2 may be determined based on a management policy of the host 1100. For example, the storage device 1200 may recognize information associated with resource usage and performance of components included in the storage device 1200, and may calculate the above time duration values based on the recognized information.

However, the above examples are provided to for better understanding, and other embodiments are not limited to the above examples. The value of the first reference time duration Tref1 may be variously changed or modified to properly complete the flush operation before an operation of the storage device 1200 is reset.

The value of the first reference time duration Tref1 may be set in various ways. In some embodiments, when the storage device 1200 is manufactured, the nonvolatile memories 1210 may store a proper value of the first reference time duration Tref1 in advance. In some embodiments, when the storage device 1200 is booted and/or when an operation of the storage device 1200 is initialized, the first reference time duration Tref1 may be set. Alternatively, when a link startup operation for interfacing between the storage device 1200 and the host 1100 is performed, the first reference time duration Tref1 may be set. In some embodiments, the first reference time duration Tref1 may be set during an operation of the storage device 1200.

In some embodiments, the host 1100 may provide the proper value of the first reference time duration Tref1. In some embodiments, the host 1100 may provide the value of the second reference time duration Tref2 to the memory controller 1250, and the memory controller 1250 may calculate the proper value of the first reference time duration Tref1 based on the value of the second reference time duration Tref2. Some additional communication protocols may be defined to transmit the value of the first reference time duration Tref1 and/or the value of the second reference time duration Tref2 between the host 1100 and the memory controller 1250.

The value of the first reference time duration Tref1 may be fixed. Alternatively, the value of the first reference time duration Tref1 may be varied based on an operating environment or performance of the storage device 1200. Other embodiments may have various modifications or changes.

Some embodiments include a storage device capable of preventing data loss even though communication with a host is interrupted. The storage device according to some embodiments may prevent data stored in a buffer from being lost when the communication with the host does not occur during a reference time duration.

In some embodiments, a storage device may include one or more nonvolatile memories, a memory controller, and a buffer. The memory controller may control the nonvolatile memories such that data provided from a host is stored in the nonvolatile memories. The buffer may temporarily store the data to be stored in the nonvolatile memories. The memory controller may include a timer circuit that is to generate an expiration signal when communication with the host does not occur during a reference time duration. The memory controller may flush the data that is temporarily stored in the buffer to the nonvolatile memories, in response to the expiration signal.

In some embodiments, a storage device may include one or more nonvolatile memories, a buffer, a timer circuit, and a memory controller. The nonvolatile memories may store data provided from a host. The buffer may temporarily store the data to be stored in the nonvolatile memories. The timer circuit may generate an expiration signal when communication with the host does not occur during a first reference time duration. The memory controller may control the nonvolatile memories and the buffer based on the expiration signal. The memory controller may receive a reset command from the host such that an operation of at least one of the nonvolatile memories, the buffer, the memory controller, and any combination thereof is reset when the communication with the host does not occur during a second reference time duration. The first reference time duration may be shorter than the second reference time duration.

In some embodiments, a storage device may include one or more nonvolatile memories, a buffer, and a memory controller. The buffer may temporarily store data that is received from the host and is to be stored in the nonvolatile memories. The memory controller may control the nonvolatile memories and the buffer, such that the data that is temporarily stored in the buffer is stored in the nonvolatile memories when communication with the host does not occur during a reference time duration. An operation of storing the data that is temporarily stored in the buffer in the nonvolatile memories may be performed without a command provided from the host.

Figure 14:
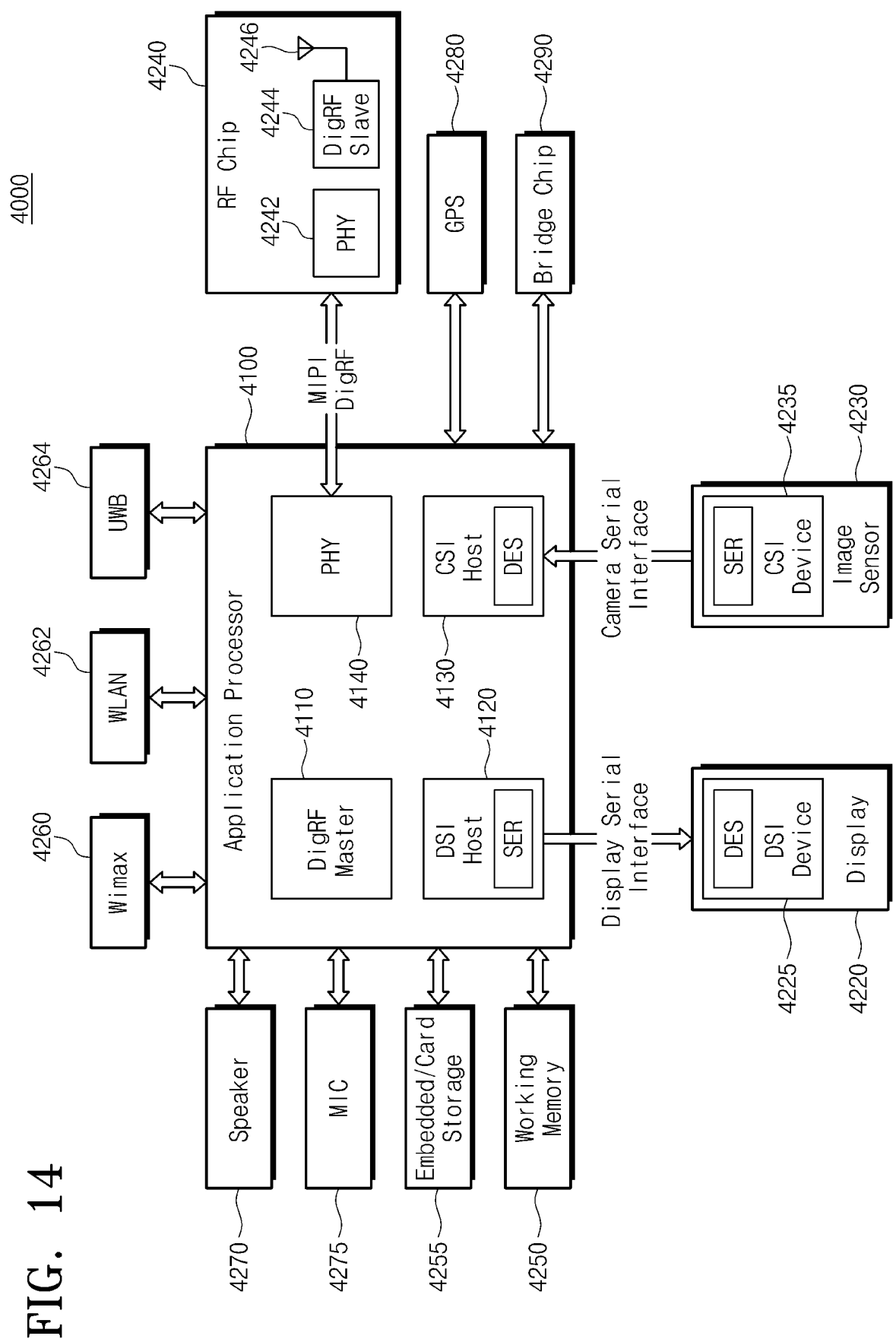
FIG. 14 is a block diagram illustrating an electronic system including a storage device according to an embodiment and interfaces thereof.

FIG. 14 is a block diagram illustrating an electronic system including a storage device according to an example embodiment and interfaces thereof. An electronic system 4000 may be implemented in a data processing device capable of using or supporting an interface proposed by mobile industry processor interface (MIPI) alliance. For example, the electronic system 4000 may be one of various electronic devices, such as a portable communication terminal, a personal digital assistant (PDA), a portable multimedia player (PMP), a smartphone, a tablet, a wearable device, and/or the like.

The electronic system 4000 may include an application processor 4100, a display 4220, and an image sensor 4230. The application processor 4100 may include a DigRF master 4110, a display serial interface (DSI) host 4120, a camera serial interface (CSI) host 4130, and a physical layer (PHY) 4140.

The DSI host 4120 may be configured to communicate with a DSI device 4225 of the display 4220 in compliance with DSI. For example, an optical serializer SER may be implemented in the DSI host 4120. For example, an optical deserializer DES may be implemented in the DSI device 4225.

The CSI host 4130 may be configured to communicate with a CSI device 4235 of the image sensor 4230 in compliance with CSI. For example, an optical deserializer DES may be implemented in the CSI host 4130. For example, an optical serializer SER may be implemented in the CSI device 4235.

The electronic system 4000 may further include a radio frequency (RF) chip 4240 for enabling communicating between the application processor 4100 and other external RF/wireless devices or systems. The RF chip 4240 may include a physical layer 4242, a DigRF slave 4244, and an antenna 4246. For example, the physical layer 4242 of the RF chip 4240 and the physical layer 4140 of the application processor 4100 may be configured to exchange data with each other in compliance with DigRF interface proposed by MIPI alliance.

The electronic system 4000 may further include a working memory 4250 and an embedded/card storage 4255. The working memory 4250 and the embedded/card storage 4255 may be configured to store data received from the application processor 4100. Moreover, the working memory 4250 and the embedded/card storage 4255 may be configured to provide the application processor 4100 with the data stored in the working memory 4250 and the embedded/card storage 4255.

The working memory 4250 may be configured to temporarily store data processed or to be processed by the application processor 4100. The working memory 4250 may include a volatile memory such as an SRAM, a DRAM, an SDRAM, or the like, and/or a nonvolatile memory such as a flash memory, a PRAM, an MRAM, a ReRAM, a FRAM, NFGM, PoRAM, or the like.

The embedded/card storage 4255 may be configured to store data regardless of a state of a power supply. The embedded/card storage 4255 may include one or more nonvolatile memories, a memory controller, and a buffer. For example, the embedded/card storage 4255 may include at least one of nonvolatile memories such as a flash memory, a PRAM, an MRAM, a ReRAM, a FRAM, NFGM, PoRAM, and/or the like. For example, the embedded/card storage 4255 may be one or more of devices such as a secure digital (SD) card, an embedded multimedia card (eMMC), and/or the like.

The embedded/card storage 4255, the working memory 4250, and or other storage devices may be implemented based on at least one embodiment, such as those described herein. For example, when communication with a host (e.g., the application processor 4100) does not occur during a reference time duration (e.g., the first reference time duration Tref1 of FIG. 4), the embedded/card storage 4255 may flush data that is stored in a buffer to the nonvolatile memories. Such a flush operation may be performed without a flush command provided from the host, i.e., the application processor 4100.

According to the some embodiments, the embedded/card storage 4255 may predict whether an error occurs in the communication with the host. Before the embedded/card storage 4255 is reset by the host, the embedded/card storage 4255 may preserve the data stored in the buffer. Accordingly, data loss may be prevented and reliability of the embedded/card storage 4255 may be improved. Furthermore, an abnormal operation or an operation interruption may be prevented.

The electronic system 4000 may be configured to communicate with an external system through a communication module, such as a worldwide interoperability for a microwave access 4260, a wireless local area network 4262, an ultra-wideband 4264, and/or the like. The electronic system 4000 may further include a speaker 4270 and a microphone 4275 for processing voice information. The electronic system 4000 may further include a global positioning system device 4280 for processing position information. The electronic system 4000 may further include a bridge chip 4290 for managing connections with peripheral devices.

Figure 15:
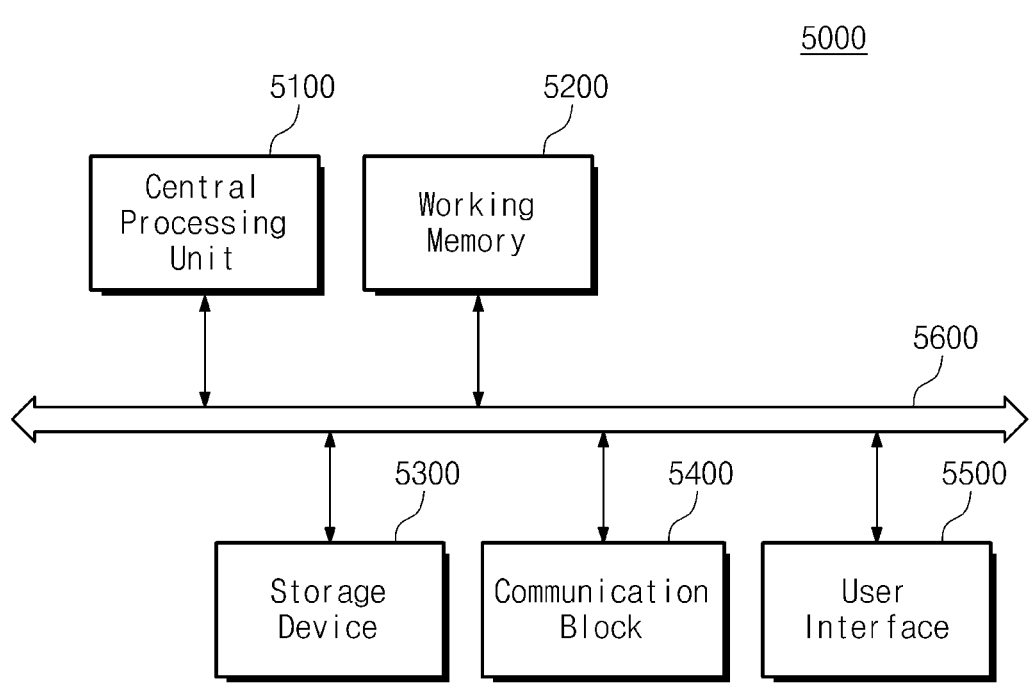
FIG. 15 is a block diagram illustrating a computing device including a storage device according to an embodiment.

FIG. 15 is a block diagram illustrating a computing device including a storage device according to an embodiment. A computing device 5000 may include a central processing unit 5100, a working memory 5200, a storage device 5300, a communication block 5400, a user interface 5500, and a bus 5600. For example, the computing device 5000 may be one of various electronic devices such as a personal computer, a workstation, a server, a notebook computer, a tablet, and/or the like.

The central processing unit 5100 may be configured to control the overall operations of the computing device 5000. The central processing unit 5100 may be configured to perform various kinds of arithmetic operations and/or logical operations. For example, the central processing unit 5100 may include a general-purposed processor, a special-purposed processor, and/or an application processor.

The working memory 5200 may be configured to exchange data with the central processing unit 5100. The working memory 5200 may be configured to temporarily store data used in an operation of the computing device 5000. The working memory may be used as a buffer or a cache of the computing device 5000. For example, the working memory 5200 may include a volatile memory system such as an SRAM, a DRAM, an SDRAM, and/or the like. The working memory 5200 may include one or more memory module or one or more memory package. In some embodiments the working memory 5200 may include nonvolatile memory modules.

The storage device 5300 may be configured to store data regardless of a state of a power supply. The storage device 5300 may include one or more nonvolatile memories, a memory controller, and a buffer. For example, the storage device 5300 may include at least one of a flash memory, a PRAM, an MRAM, a ReRAM, an PRAM, and/or the like. For example, the storage device 5300 may include a storage medium such as a solid state drive (SSD).

The storage device 5300 may be implemented based on an embodiment similar to at least one of the embodiments described herein. When communication with a host (e.g., the central processing unit 5100) does not occur during a reference time duration (e.g., the first reference time duration Tref1 of FIG. 4), the storage device 5300 may flush data stored in a buffer to the nonvolatile memories. Such a flush operation may be performed without a flush command provided from the host.

According to some embodiments, the storage device 5300 may predict whether an error occurs in communication with the host. The storage device 5300 may be configured to preserve the data stored in the buffer, before the storage device 5300 is reset by the host. Accordingly, data loss may be prevented, and reliability of the storage device 5300 may be improved. Furthermore, an abnormal operation or an operation interruption may be prevented.

The communication block 5400 may be configured to communicate with an external device located outside the computing device 5000, under the control of the central processing unit 5100. The communication block 5400 may be configured to communicate with an external device in compliance with one or more of various wireless communication protocols, such as long term evolution (LTE), WiMax, global system for mobile communication (GSM), code division multiple access (CDMA), Bluetooth, near field communication (NFC), wireless fidelity (WiFi), radio frequency identification (RFID), and the like, and/or one or more of various wired communication protocols, such as transfer control protocol/internet protocol (TCP/IP), USB, SCSI, ATA, PATA, SATA, SAS, IDE, Firewire, and/or the like.

The user interface 5500 may be configured to arbitrate communication between a user and the computing device 5000 under the control of the central processing unit 5100. For example, the user interface 5500 may include one or more of various input interfaces, such as a keyboard, a mouse, a keypad, a button, a touch panel, a touch screen, a touch pad, a touch ball, a camera, a microphone, a gyroscope sensor, a vibration sensor, and/or the like. Furthermore, the user interface 5500 may include one or more of various output interfaces, such as a liquid crystal display (LCD) device, a light emitting diode (LED) display device, an organic LED (OLED) display device, an active matrix OLED (AMOLED) display device, a speaker, a motor, and/or the like.

The bus 5600 may be configured to provide a communication path between components of the computing device 5000. The components of the computing device 5000 may exchange data with each other based on a bus format of the bus 5600. For example, the bus format may include one or more of various protocols, such as USB, SCSI, PCIe, NVMe, ATA, PATA, SATA, SAS, IDE, UFS, and/or the like.

Circuits, chips, and devices according to the embodiments described herein may be mounted using various kinds of semiconductor packages. For example, circuits, chips, and devices according to the embodiments described herein may be mounted using various kinds of semiconductor packages, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), thin quad flat pack (TQFP), small outline integrated circuit (SOIC), shrink small outline package (SSOP), thin small outline package (TSOP), system in package (SIP), multichip package (MCP), wafer-level fabricated package (WFP), wafer-level processed stack package (WSP), and/or the like.

According to the some embodiments, a storage device may predict whether an error occurs in communication with a host. When the communication with the host is interrupted due to the error, the storage device may prevent data stored in a buffer from being lost, before the storage device is reset by the host. Accordingly, the host may stably communicate with the storage device, and reliability of the storage device may be improved.

The configuration shown in each of conceptual diagrams is to be understood just from the conceptual point of view. To help better understanding of the embodiments, forms, structures, and sizes of each component shown in each conceptual diagram have been exaggerated or reduced. A configuration actually implemented may have a different physical shape from that shown in each conceptual diagram. Each conceptual diagram is not intended to limit the physical shape of the components.

A device configuration shown in each block diagram is provided to help better understanding of the embodiments. Each block may be formed of smaller blocks according to functions. Alternatively, multiple blocks may form a larger block according to a function. That is, the spirit or the scope of other embodiments is not limited to the configuration shown in a block diagram.

Above, embodiments have been described based on particularly described embodiments. However, other embodiments may be different from the above particular embodiments according to the nature of the art. Therefore, it should be understood that the above particular embodiments are in descriptive and illustrative views, rather than restrictive views. That is, the embodiments include the variations and modifications of the particular embodiments described herein.

Accordingly, a modified or altered technical concept without departing from the scope or the spirit of the embodiments is included in the scope of the claims below. The scope of the embodiments is not limited to the above particular embodiments.

What is claimed is:

1. A storage device comprising:
   at least one nonvolatile memory;
   a buffer; and
   a memory controller configured to:
      receive first data from a host;
      store the first data in the buffer;
      determine whether communication between the host and the memory controller does not occur during a first reference time duration;
      in response to determining that the first reference time duration elapses without the communication, flush the first data in the buffer to the at least one nonvolatile memory without a flush command provided from the host when the first reference time duration elapses,
      receive a value of a second reference time duration from the host; and
      calculate a value of the first reference time duration, by subtracting a time taken to store the first data stored in the buffer in the at least one nonvolatile memory and a time taken to complete execution of a command that is not processed by the memory controller from the value of the second reference time duration,
      wherein the memory controller does not receive a command or a second data from the host during the first reference time duration.

2. The storage device of claim 1, wherein:
   the memory controller comprises a timer circuit configured to generate an expiration signal when the first reference time elapses; and
   the memory controller is further configured to flush the first data in the buffer to the at least one nonvolatile memory in response to the expiration signal.

3. The storage device of claim 1,
   wherein the memory controller is further configured to flush the first data in the buffer to the at least one nonvolatile memory before receiving a reset command from the host at an end of a second reference time duration greater than the first reference time duration, and
   wherein the reset command causes to initialize the at least one nonvolatile memory, the buffer and the memory controller of the storage device.

4. The storage device of claim 1,
   wherein the communication between the host and the memory controller comprises at least one of receiving the command from the host, receiving the second data from the host, or transmitting a response to the host.

5. The storage device of claim 1,
   wherein the memory controller comprises:
      a host interface manager configured to interface with the host;
      a memory interface manager configured to interface with the at least one nonvolatile memory;
      a buffer manager configured to manage an operation of the buffer; and
      a processor configured to operate at least one of the host interface manager, the memory interface manager, or the buffer manager.

6. The storage device of claim 5, wherein:
   the memory controller further comprises a timer circuit configured to generate an expiration signal when the first reference time duration elapses;
   the memory controller is further configured to flush the first data in the buffer to the at least one nonvolatile memory in response to the expiration signal; and
   the processor is further configured to initialize an operation of the timer circuit in response to a communication between the host interface manager and the host.

7. The storage device of claim 6,
   wherein the processor is further configured to initialize the timer circuit in response to the communication between the host interface manager and the host occurring.

8. The storage device of claim 6,
   wherein the host interface manager is further configured to initialize the timer circuit in response to the communication between the host interface manager and the host occurring.

9. The storage device of claim 6,
   wherein the buffer manager is further configured to control the buffer such that the first data in the buffer is flushed to the at least one nonvolatile memory in response to the expiration signal.

10. The storage device of claim 6,
    wherein the host interface manager is further configured to transmit a flush signal to the buffer manager in response to the expiration signal.

11. The storage device of claim 10,
    wherein the buffer manager is further configured to control the buffer such that the first data in the buffer is flushed to the at least one nonvolatile memory in response to the flush signal.

12. The storage device of claim 1,
wherein the memory controller is further configured to control the at least one nonvolatile memory such that mapping data associated with the flushed first data is stored in the at least one nonvolatile memory, the mapping data indicating a memory location storing the flushed first data in the at least one nonvolatile memory.

13. The storage device of claim 1, further comprising:
a timer circuit configured to generate an expiration signal when the first reference time duration elapses,
wherein the memory controller is further configured to flush the first data in the buffer based on the expiration signal.

14. The storage device of claim 1,
wherein the memory controller is further configured to receive a value of the first reference time duration from the host.

15. A storage device comprising:
at least one nonvolatile memory;
a buffer; and
a memory controller configured to:
  receive first data from a host;
  store the first data in the buffer;
  determine whether communication between the host and the memory controller does not occur during a first reference time duration;
  in response to determining that the first reference time duration elapses without the communication, flush the first data in the buffer to the at least one nonvolatile memory without a flush command provided from the host when the first reference time duration elapses;
  control the at least one nonvolatile memory such that mapping data associated with the flushed first data is stored in the at least one nonvolatile memory, the mapping data indicating a memory location storing the flushed first data in the at least one nonvolatile memory;
  reset the at least one nonvolatile memory, the buffer, and the memory controller in response to a reset command received by the memory controller from the host after the first data in the buffer is flushed;
  communicate with the host based on the mapping data and the flushed first data that is stored in the at least one nonvolatile memory after resetting the at least one nonvolatile memory, the buffer and the memory controller;
  receive a value of a second reference time duration from the host; and
  calculate a value of the first reference time duration, by subtracting a time taken to store the first data stored in the buffer in the at least one nonvolatile memory and a time taken to complete execution of a command that is not processed by the memory controller from the value of the second reference time duration,
wherein the memory controller does not receive a command or a second data from the host during the first reference time duration.

16. A storage device comprising:
at least one nonvolatile memory;
a buffer; and
a memory controller configured to:
  receive first data from a host;
  store the first data in the buffer;
  determine whether communication between the host and the memory controller does not occur during a first reference time duration;
  in response to determining that the first reference time duration elapses without the communication, flush the first data in the buffer to the at least one nonvolatile memory without a flush command provided from the host, at an end of the first reference time duration;
  reset the at least one nonvolatile memory, the buffer and the memory controller at an end of a second reference time duration greater than the first reference time duration;
  receive a value of a second reference time duration from the host; and
  calculate a value of the first reference time duration, by subtracting a time taken to store the first data stored in the buffer in the at least one nonvolatile memory and a time taken to complete execution of a command that is not processed by the memory controller from the value of the second reference time duration,
wherein the memory controller does not receive a command or a second data from the host during the first reference time duration.

* * * * *